United States Patent
Chen

(10) Patent No.: US 7,254,365 B2
(45) Date of Patent: Aug. 7, 2007

(54) ANTENNA DIRECTIVITY ESTIMATOR FOR A RECONFIGURABLE ANTENNA

(75) Inventor: Jacqueline C. Chen, La Canada, CA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 10/781,511

(22) Filed: Feb. 18, 2004

(65) Prior Publication Data

US 2004/0171409 A1 Sep. 2, 2004

Related U.S. Application Data

(60) Provisional application No. 60/448,385, filed on Feb. 18, 2003.

(51) Int. Cl.
*H04B 7/185* (2006.01)

(52) U.S. Cl. .................... 455/13.3; 455/13.4; 455/429; 342/359

(58) Field of Classification Search ............... 455/12.1, 455/13.3, 13.4, 562.1, 427–430; 342/359, 342/371, 372
See application file for complete search history.

(56) References Cited

U.S. PATENT DOCUMENTS

2001/0049295 A1 * 12/2001 Matsuoka et al. .......... 455/562

* cited by examiner

*Primary Examiner*—Lee Nguyen
(74) *Attorney, Agent, or Firm*—Gates & Cooper LLP

(57) ABSTRACT

A method and apparatus for redistributing power radiated by an antenna comprised of a plurality of antenna elements. An antenna directivity estimator function is performed to screen out inappropriate antenna directivity profiles from a plurality of antenna directivity profiles, thereby determining one or more remaining, appropriate antenna directivity profiles. An optimizer function is performed on the remaining, appropriate antenna element directivities to determine a phase distribution for the antenna elements based on a desired power distribution for the antenna.

28 Claims, 13 Drawing Sheets

ANTENNA DIRECTIVITY ESTIMATOR FOR A RECONFIGURABLE ANTENNA

CROSS-REFERENCE TO RELATED APPLICATIONS

This application claims the benefit under 35 U.S.C. §119 (e) of co-pending and commonly-assigned U.S. Provisional Patent Application Ser. No. 60/448,385, filed Feb. 18, 2003, by Jacqueline C. Chen, entitled "ANTENNA DIRECTIVITY ESTIMATOR FOR THE RECONFIGURABLE ANTENNA," attorneys' docket number PD-02-1282/012321, which application is incorporated by reference herein.

BACKGROUND OF THE INVENTION

1. Field of the Invention

The present invention relates in general to methods of directing spacecraft payloads, and in particular to a method and apparatus for estimating antenna directivity for a reconfigurable phased array antenna on a spacecraft in order to reconfigure the antenna within a specified time limit.

2. Description of the Related Art

Satellite systems are widely used to transmit information to many ground users. In satellite-based communication, it is desirable to transmit information to ground-based users in certain areas, but not the ground-based users in other areas. This is accomplished with the use of "shaped beams" that concentrate the energy of the transmitted signal to a limited terrestrial area, known as a coverage area for the antenna.

It may be desired to optimize the use of such shaped beams, based on external factors. For example, it may be desired to redistribute the power radiated by the satellite's antenna dynamically based on weather conditions. For example, higher power may be required to compensate for rainy weather conditions in certain portions of the coverage area, while lower power can be used for sunny weather conditions in other portions of the coverage area. If power can be dynamically shared or redistributed between rainy and sunny portions of the coverage area, the overall power of the antenna can be utilized more efficiently. As a result, the satellite will provide less power for dynamic power distribution than for static power distribution.

Weather-driven dynamic power control is a great method to conserve resources and reduce costs on satellites. However, satellites still need to provide good service to those portions of the coverage area receiving lower power as the weather changes. The challenge is to calculate a reasonable power distribution among many possible power distributions and then re-configure the antenna to use the reasonable power distribution. Moreover, the reasonable power distribution over the coverage area and the reconfiguration of the antenna must be calculated within a specified time limit, which may be governed by how fast the weather conditions are updated.

Preferably, the antennas on the satellite are dynamically re-configurable in order to perform the dynamic power re-distribution. One type of re-configurable antenna is a phased array antenna with multiple elements. The phase distribution of the antenna elements controls the radiated antenna pattern, and consequently changes the power distribution over the coverage area.

The process of acquiring the phase distribution of the antenna elements is a time consuming task, e.g., 8-15 minutes per phase distribution optimization. The phase distribution of the elements in the phased array antenna must be adjusted in order to generate an antenna pattern that distributes the power on a coverage area with the best service to the users. The power distribution over the coverage area is described as the antenna directivity profile.

However, the optimization of the phase distribution may include inappropriate or impossible requests (antenna directivity profiles) for phase adjustments. In order to enhance such optimizations, such inappropriate or impossible requests should be eliminated from consideration to speed up the process. The present invention provides a system to perform this function.

SUMMARY OF THE INVENTION

To address the requirements described above, the present invention discloses a method and apparatus for redistributing power radiated by an antenna comprised of a plurality of antenna elements. An antenna directivity estimator function is performed to quickly screen out inappropriate antenna directivity profiles (desired power distribution) from a plurality of antenna directivity profiles, wherein each of the antenna directivity profiles comprises a specific power distribution. The remaining, appropriate antenna directivity profiles are then sent to an optimizer function. The optimizer function is performed on the remaining, appropriate antenna directivity profiles to determine a phase distribution for the antenna elements based on a desired power distribution for the antenna.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
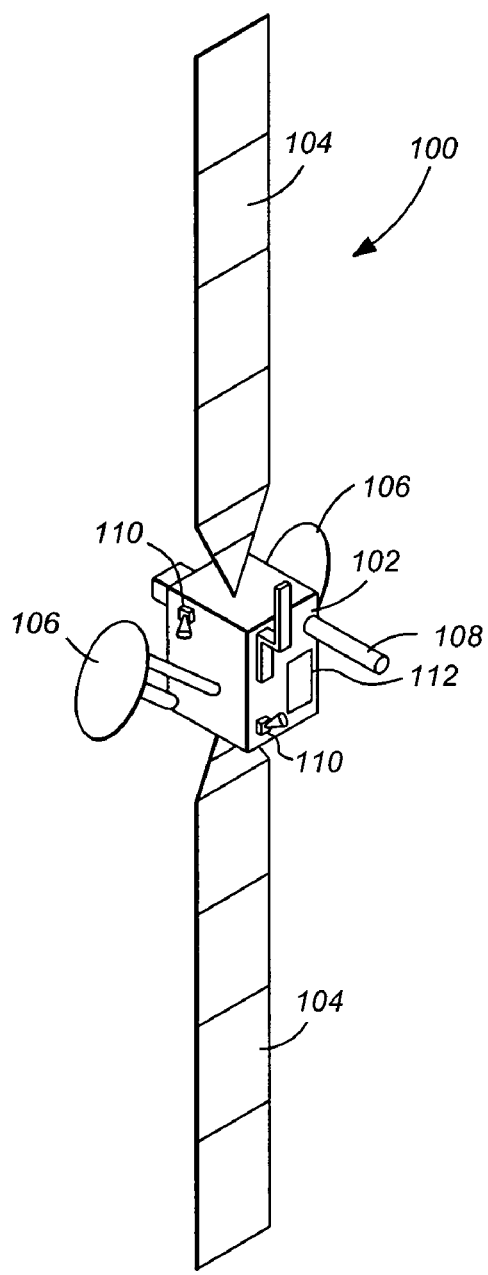
FIG. 1 is a diagram illustrating a satellite or spacecraft.

FIG. 1 illustrates a three-axis stabilized satellite or spacecraft 100. The spacecraft 100 is either situated in a stationary (geostationary or geosynchronous) orbit about the Earth, or in a mid-Earth orbit (MEO) or low-Earth orbit (LEO). The satellite 100 has a main body or spacecraft bus 102, a pair of solar panels 104, a pair of high gain narrow beam antennas 106, and a telemetry and command omni-directional antenna 108 that is aimed at a control ground station. The satellite 100 may also include one or more sensors 110 to measure the attitude of the satellite 100, such as sun sensors, earth sensors, and star sensors.

The spacecraft 100 includes a phased array antenna 112 mounted on the spacecraft bus 102 or a supporting structure. The phased array antenna 112 can be used to transmit signals with wide angle or spot beams as desired. In this embodiment, the antenna 112 is a 1500-element phased array antenna, although other antenna 112 configurations could be used as well.

Figure 2:
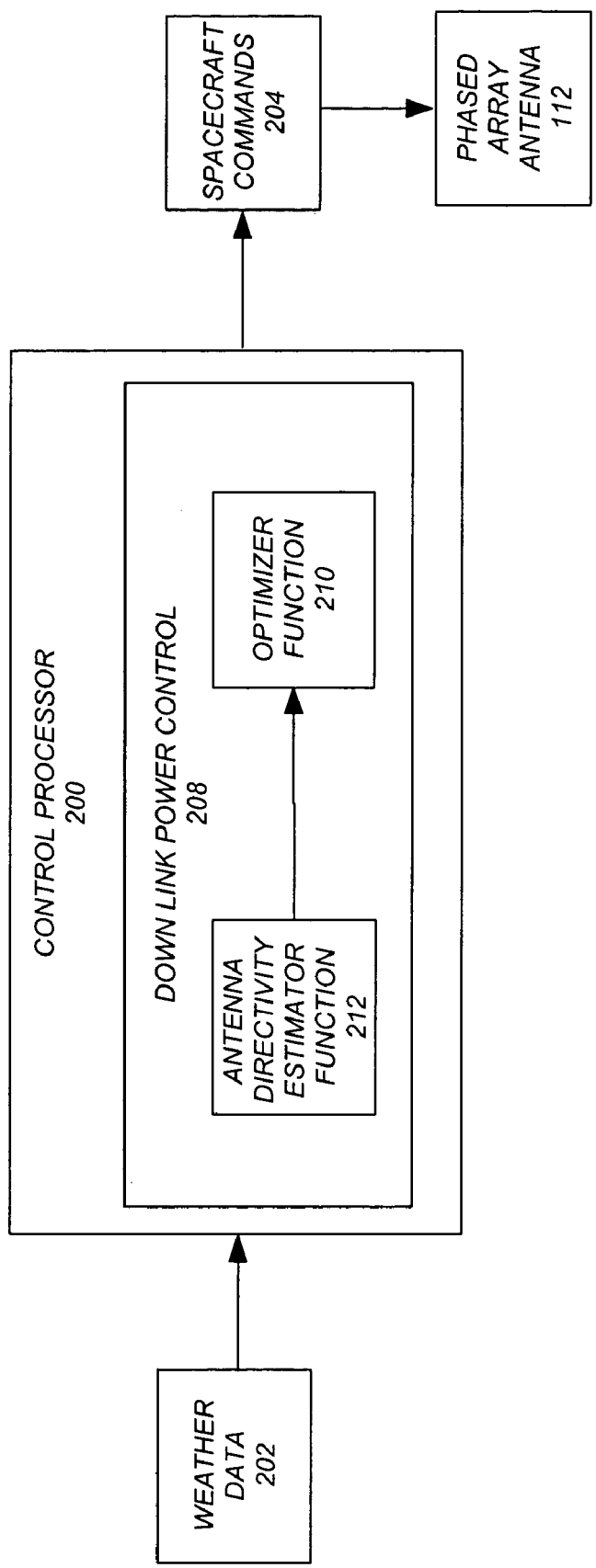
FIG. 2 is a diagram depicting the functional architecture of a representative spacecraft control system.

FIG. 2 is a block diagram of a control processor (CP) 200 for controlling the spacecraft 100 according to a preferred embodiment of the present invention. In the preferred embodiment, the control processor 200 resides in a ground-based control center, although other embodiments may place the control processor on the spacecraft 100 itself.

Input to the control processor 200 may come from a combination of any number of components and systems, such as weather data 202. In turn, the control processor 200 generates any number of control commands 204 that are directed at the various spacecraft 100 components and subsystems, and more specifically, the phased array antenna 112.

In a preferred embodiment, the control processor 200 performs a Down Link Power Control (DLPC) 208 with regards to the antenna 112. The objective of the Down Link Power Control 208 is to redistribute the power radiated by the antenna 112 over the Continental U.S. (CONUS) dynamically based on weather conditions, as communicated to the control processor 200 by the weather data 202.

The amplitudes of the 1500 elements in the phased array antenna 112 are fixed with tapered distribution, while the phases of the antenna 112 elements can be adjusted for different patterns. In the preferred embodiment, the Down Link Power Control 208 must update the phase distribution of the antenna 112 elements in a cycle time of less than five-minutes, in order to keep up with the motion of weather conditions. An Optimizer function 210 of the Down Link Power Control 208 is used to determine an optimization of the phase distribution based on the desired power distribution.

However, multiple optimizations may be needed and could exceed the cycle time limit. Hence, an Antenna Directivity Estimator (ADE) function 212 is used to screen out inappropriate antenna directivity profiles, before they are passed to the Optimizer function 210. The Antenna Directivity Estimator function 212 thus speeds up the Down Link Power Control 208.

Figure 3:
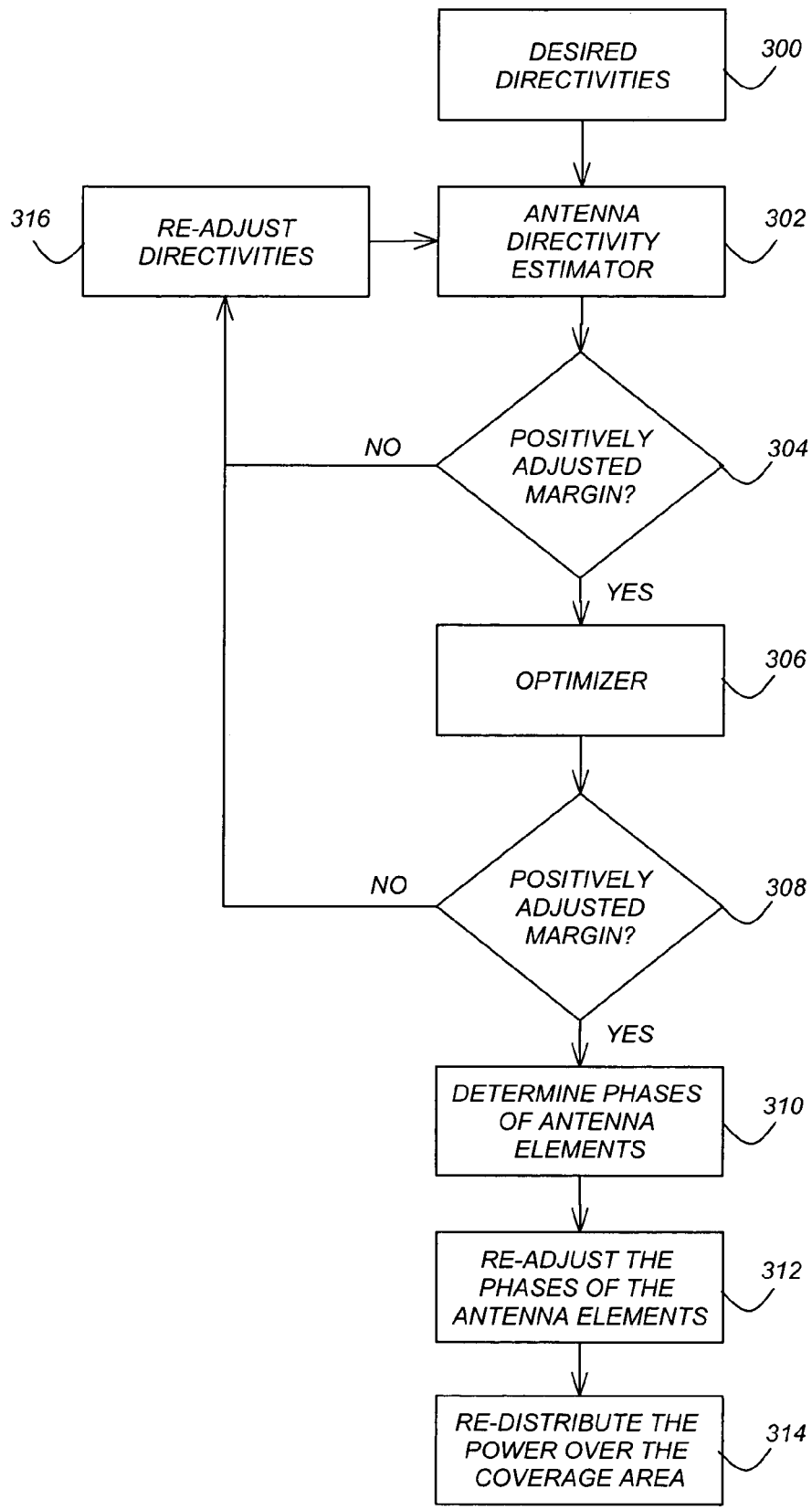
FIG. 3 is a flow chart that illustrates the steps performed by the downlink power control function according to the preferred embodiment of the present invention.

FIG. 3 is a flow chart that illustrates the steps performed for a method of redistributing power radiated by an antenna 112 comprised of a plurality of antenna 112 elements according to the preferred embodiment of the present invention. However, those skilled in the art will recognize that other steps or logic could also be used without departing from the scope of the present invention.

Block 300 represents the input of a plurality of antenna 112 directivities (i.e., antenna 112 amplitudes).

Block 302 represents the Antenna Directivity Estimator function 212 being performed to screen out inappropriate antenna 112 directivity profiles from a plurality of antenna 112 directivity profiles, thereby generating one or more remaining, appropriate antenna 112 directivity profiles. Specifically, the inappropriate antenna 112 directivity profiles comprise impossible antenna 112 directivity profiles, and the Antenna Directivity Estimator function 212 is performed to screen out impossible antenna 112 directivity profiles.

Block 304 is a decision block that determines whether there has been a positively adjusted margin by the Antenna Directivity Estimator function 212 in screening out the inappropriate antenna 112 directivity profiles. If so, control transfers to the Optimizer function 210 at Block 306; otherwise; control transfers to Block 314.

Block 306 represents the Optimizer function 210 being performed on the remaining, appropriate antenna 112 directivity profiles to determine a phase distribution for the antenna 112 elements based on a desired power distribution for the antenna 112 elements.

Block 308 is a decision block that determines whether there has been a positively adjusted margin by the Optimizer function 210 in determining the phase distribution for the antenna 112 elements. If so, control transfers to Block 310; otherwise; control transfers to Block 316.

Block 310 represents the Down Link Power Control 208 determining the phases of the antenna 112 elements based on the phase distribution generated by the Optimizer function 210.

Block 312 represents the Down Link Power Control 208 re-adjusting the phases of the antenna 112 elements determined by Block 310.

Block 314 represents the Down Link Power Control 208 re-distributing power to the coverage area based on the re-adjusted phases of the antenna 112 elements.

Block 316 represents the Down Link Power Control 208 re-adjusting the antenna 112 directivities when the Antenna Directivity Estimator function 212 does not generate a positively adjusted margin. Thereafter, control is transferred to Block 302 again.

Antenna Directivity Estimator

There are two important rules followed by every antenna 112:

(1) The antenna 112 can not violate the laws of physics: the total radiated power of the antenna 112 must be conserved. If the directivity requested over the coverage area is beyond a gain area product of the antenna 112, the antenna 112 can not reach the desired directivity. The antenna 112 will perform roughly with the desired directivity profile, but with a constant negative shift.

(2) The larger the antenna 112 aperture, the sharper the beam it can generate. Only an antenna 112 with infinite large aperture size can have an extremely narrow (delta function) beam. The co-polar performance of an antenna 112 with a limited size aperture looks more like a Gaussian distribution with a smooth roll-off than a delta curve with a sharp roll-off.

Figure 4:
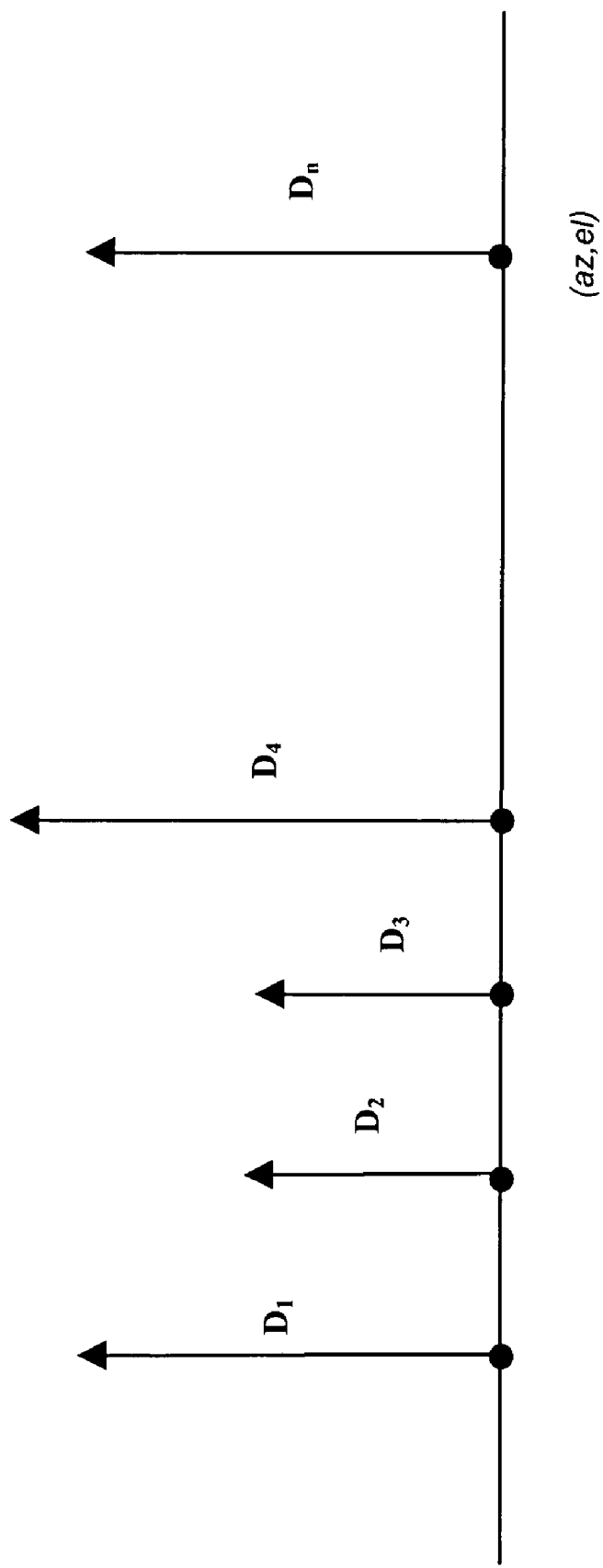
FIG. 4 is a graph illustrating an antenna desired directivity profile.

The desired performance of the antenna 112 pattern is usually represented as a set of Point Set Array (PSA) points over a coverage area, and each of the PSA points is assigned a desired directivity. In other words, the desired directivities are a set of delta functions with different heights, which are shown as D1-Dn in FIG. 4, which is an antenna 112 directivity profile. The PSA points in FIG. 4 are represented by an (azimuth, elevation) pair, for example, labeled as (az, el).

Figure 5:
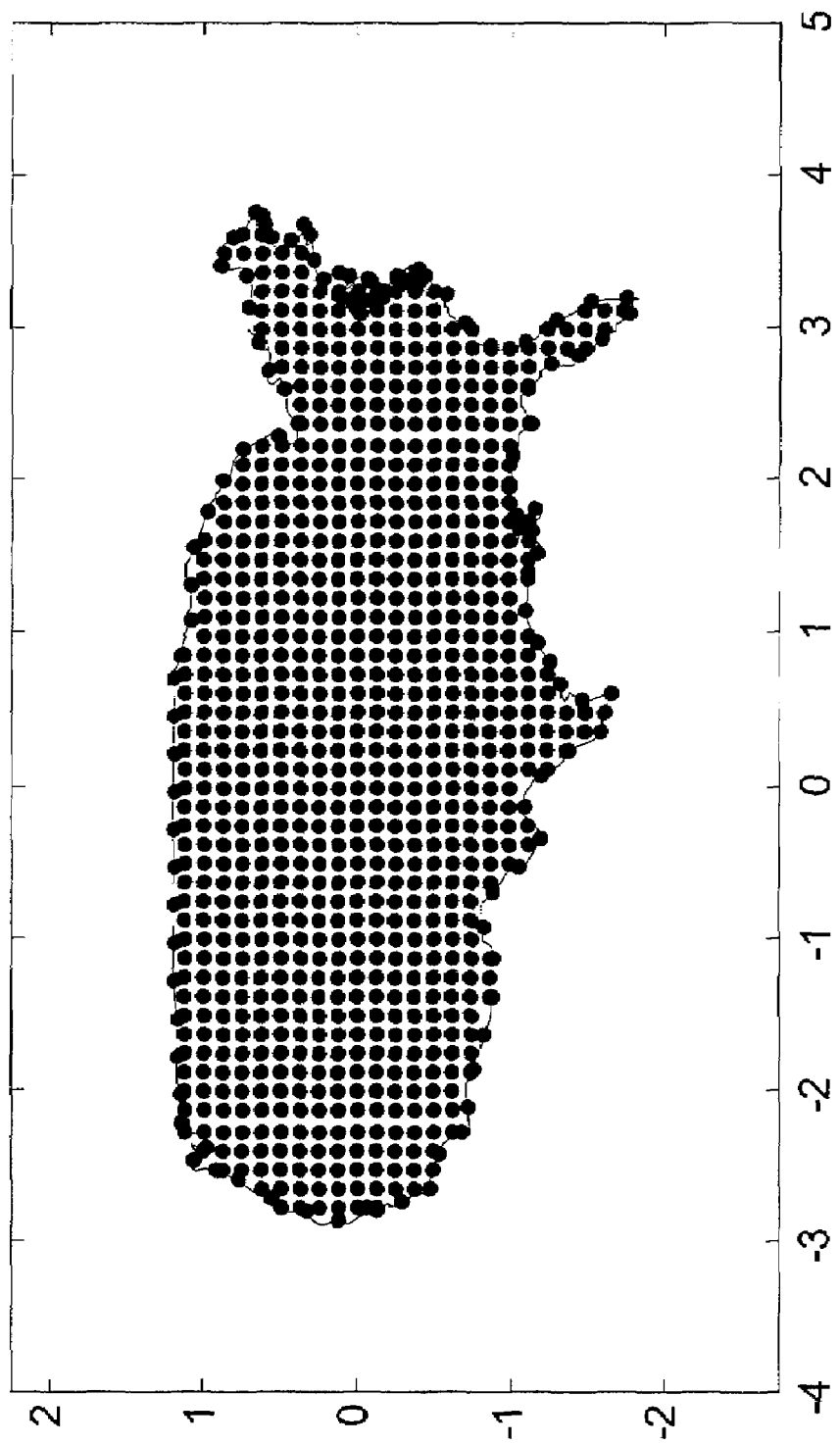
FIG. 5 is a graph illustrating a plurality of point set array (PSA) points over the continental U.S.

As shown in the map of FIG. 5, there are 915 PSA points over the CONUS used for the antenna 112 in the preferred embodiment. The horizontal and vertical axes of the graph of FIG. 5 are labeled in degrees, wherein most of the PSA points are spaced 0.125 degrees apart, except the points along the CONUS borders. These discrete points with sharp roll-off will be smoothed due to the nature of the antenna 112.

Theory of Operation

The basic theory of operation of the Antenna Directivity Estimator function 212 is to smooth the antenna 112 directivity profile based on the physics described above. Also, the total power of the curve-fitted pattern must be conserved.

Several methods have been investigated. The fact that only the desired amplitudes (directivities), not both the amplitudes and phases, of the far field pattern are available leads to the method described below.

Figure 6:
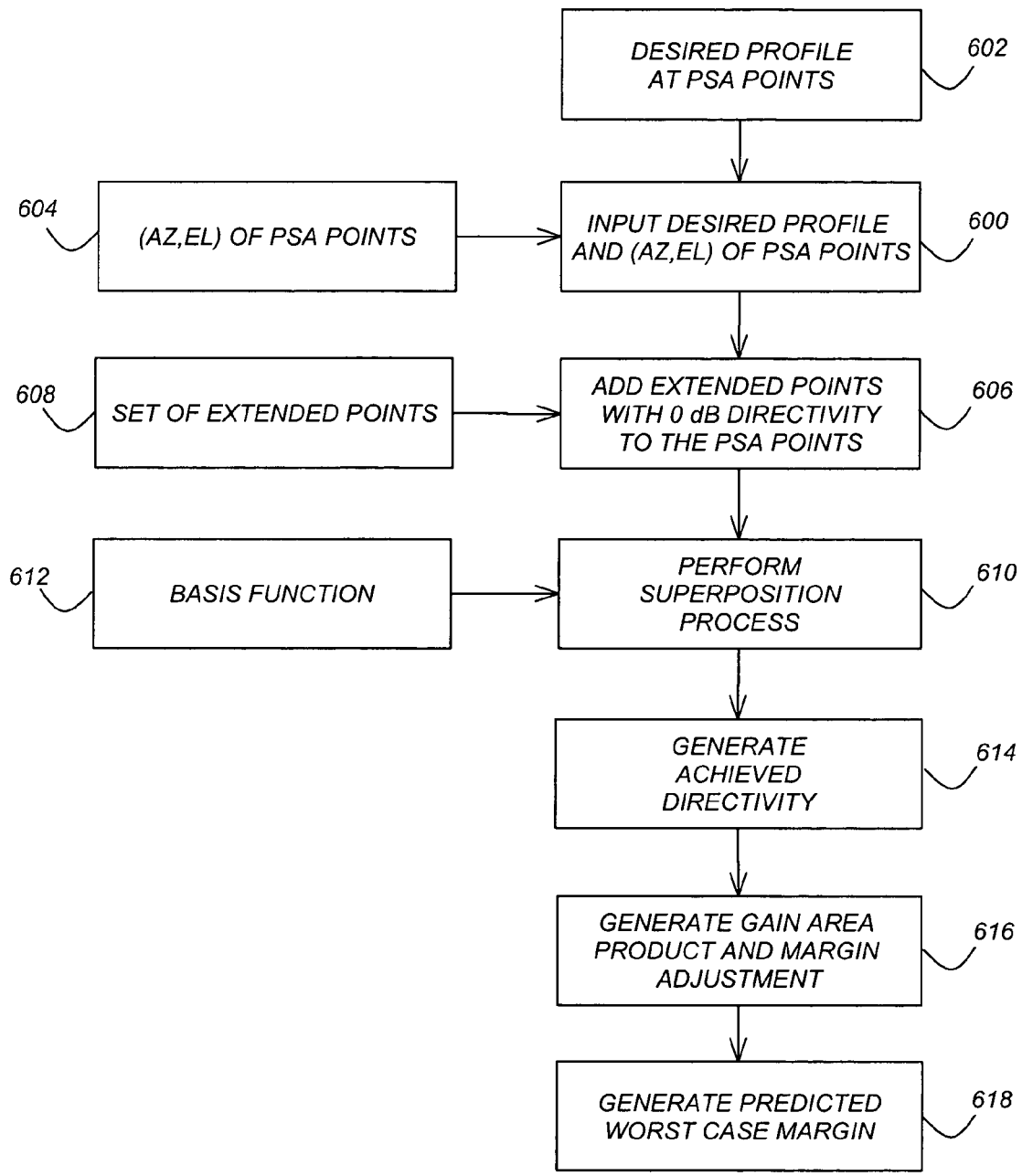
FIG. 6 is a flow chart that illustrates the steps performed by the antenna directivity estimator function of the downlink power control function according to the preferred embodiment of the present invention.

FIG. 6 is a flow chart that illustrates the steps performed by the Antenna Directivity Estimator function 212 according to the preferred embodiment of the present invention. However, those skilled in the art will recognize that other steps or logic could also be used without departing from the scope of the present invention.

Block 600 represents the Antenna Directivity Estimator function 212 inputting the desired antenna 112 directivity profile 602 at the PSA points, as well as the azimuth (az) and elevation (el) of the PSA points 604.

Block 606 represents the Antenna Directivity Estimator function 212 adding extended points 608 to the PSA points. Preferably, these extended points have 0 db directivity.

Block 610 represents the Antenna Directivity Estimator function 212 performing a superposition process on the PSA points using a basis function 612.

Block 614 represents the Antenna Directivity Estimator function 212 generating an achieved directivity profile for the PSA points following the superposition process.

Block 616 represents the Antenna Directivity Estimator function 212 generating a gain area product and a margin adjustment using the achieved directivity for the PSA points.

Block 618 represents the Antenna Directivity Estimator function 212 generating a predicated worst case margin using the regional gain area product and the margin adjustment.

As shown in the flowchart of FIG. 6, the Antenna Directivity Estimator function 212 includes three major steps (1) select a basis function for the superposition process in the far field; (2) calculate the antenna 112 directivities by superposing the basis function on each point of desired directivity (delta function); and (3) calibrate the whole pattern of antenna 112 elements with a proper height by applying power conservation.

Basis Function

Figure 7:
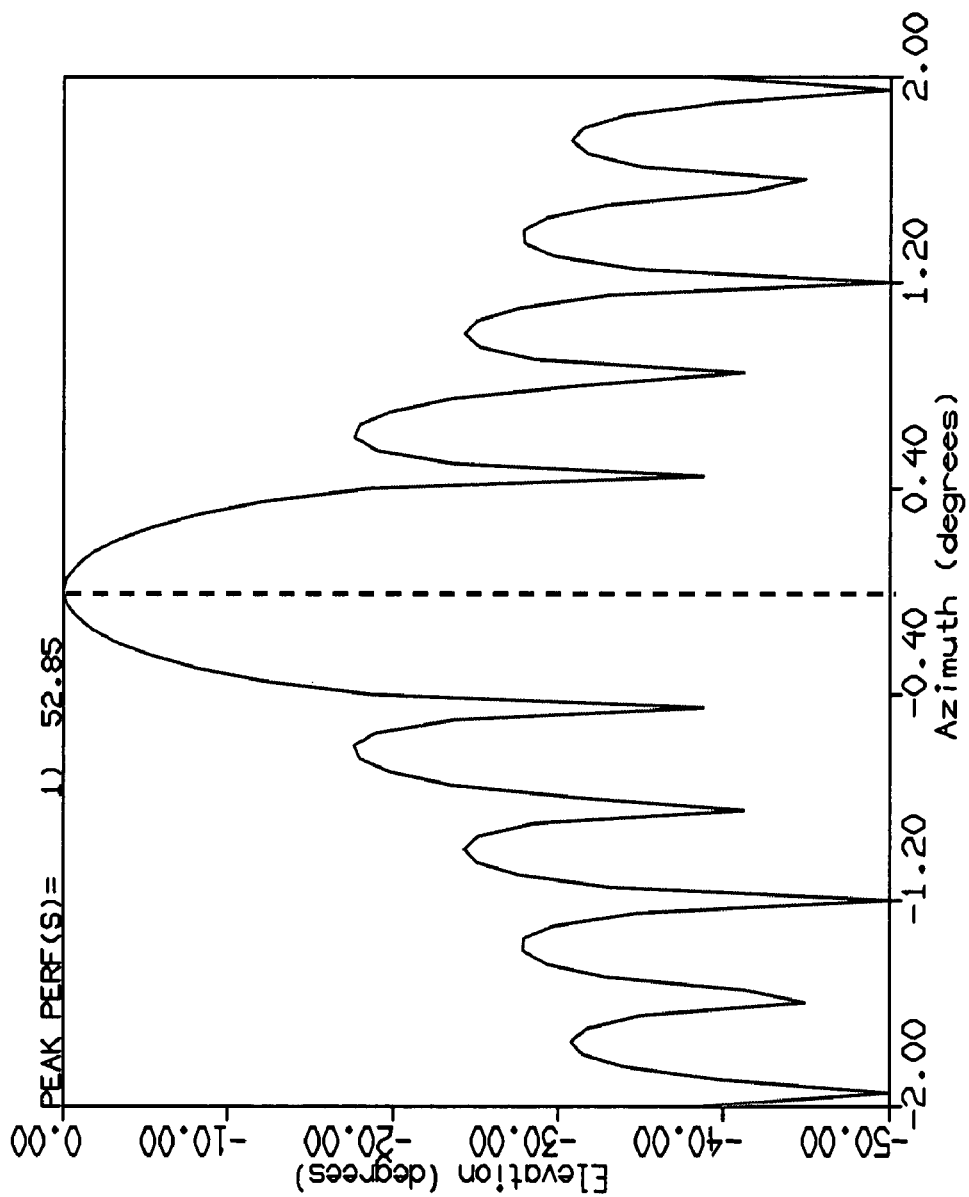
FIG. 7 is a graph illustrating a basis pattern of a phased array antenna.

With regard to the first major step, a curve must be chosen for the superposition process to transform the desired directivities into a smooth antenna 112 profile. Cosine, sine, and real antenna patterns were considered. After a number of trials, it was determined that the narrowest beamwidth that an antenna 112 can generate is the best choice. Consequently, the characteristic of the antenna 112 is embedded in the Antenna Directivity Estimator function 212. As noted above, the antenna 112 is a direct radiation array of 1500 elements, and thus the narrowest basis beam of the antenna 112 is a pattern with all antenna 112 elements having equal amplitude and equal phase. A pattern with all antenna 112 elements having equal amplitudes and equal phases at 19.95 GHz is shown in the graph of FIG. 7. This two-dimensional pattern is described in a numerical data file and is an input to the Antenna Directivity Estimator function 212 as the basis function 612.

Methodology

Figure 8:
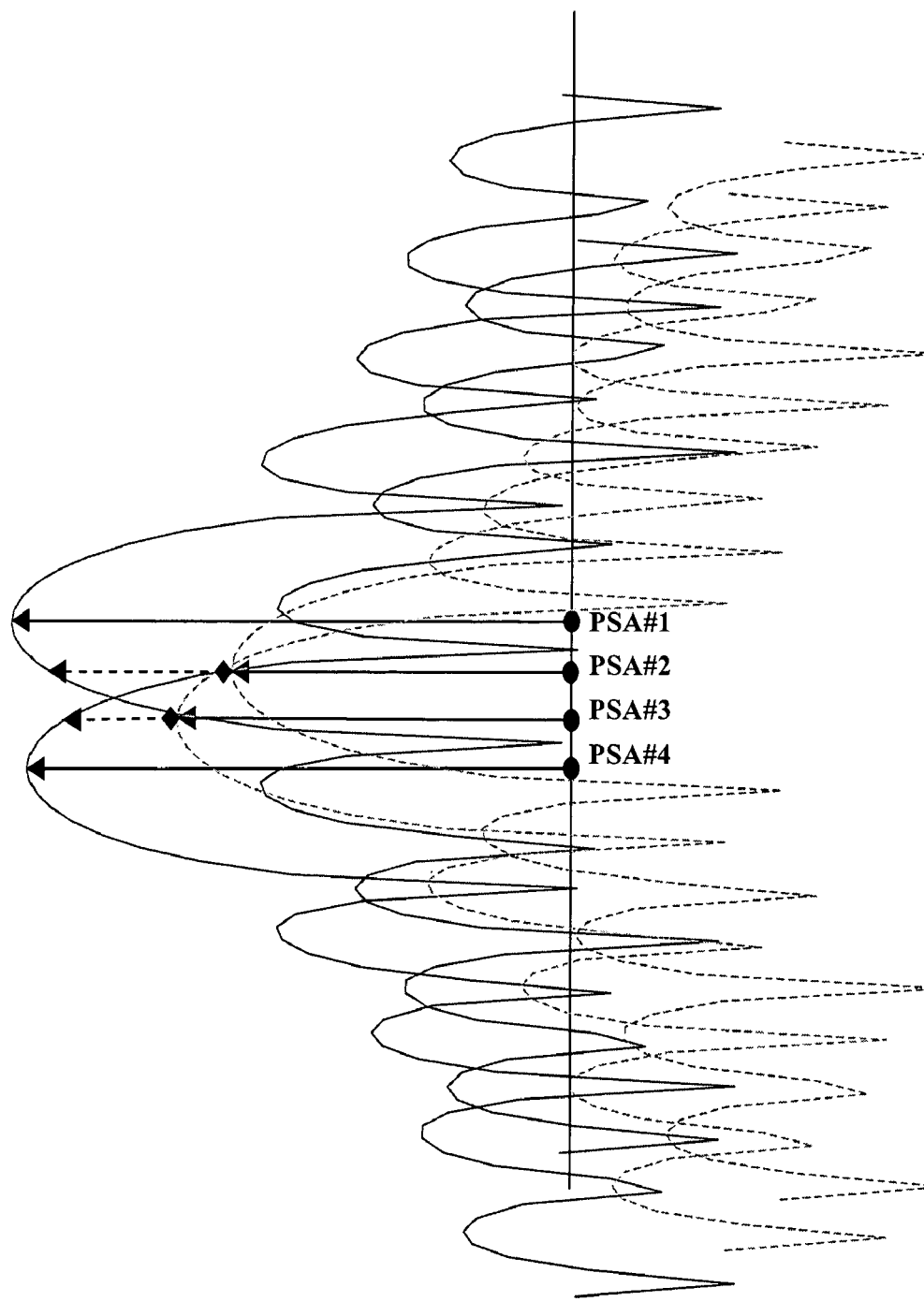
FIG. 8 is a graph illustrating a superposition of basis functions over the desired directivity profile.

The desired directivity at each PSA point is a delta function, and each delta function is replaced by the basis function with a same height (directivity) for the antenna 112 directivity profile. An example of four PSA points is shown in the graph of FIG. 8 as PSA points #1-4 with directivities represented by solid arrows (delta functions). Four basis functions then replace the corresponding delta functions. As a result of superposition, the directivities of the PSA points #2 and #3 are raised by the amount shown in the dashed arrows. The directivities of the PSA points #1 and #4 remain the same since there are no surrounding PSAs imposing on them to raise their levels.

The directivity of each PSA point may be increased by the maximum directivity increment due to the superposition of the surrounding PSA points as described in the following equation:

$$\Delta D_i = \max_{\substack{n=1,N \\ n \ne i}} [\Delta D_n]$$

wherein $\Delta D_i$ is a directivity increment of an ith PSA point due to superposition and $\Delta D_n$ is a directivity increment from an nth PSA point imposing on the ith PSA point.

Figure 9:
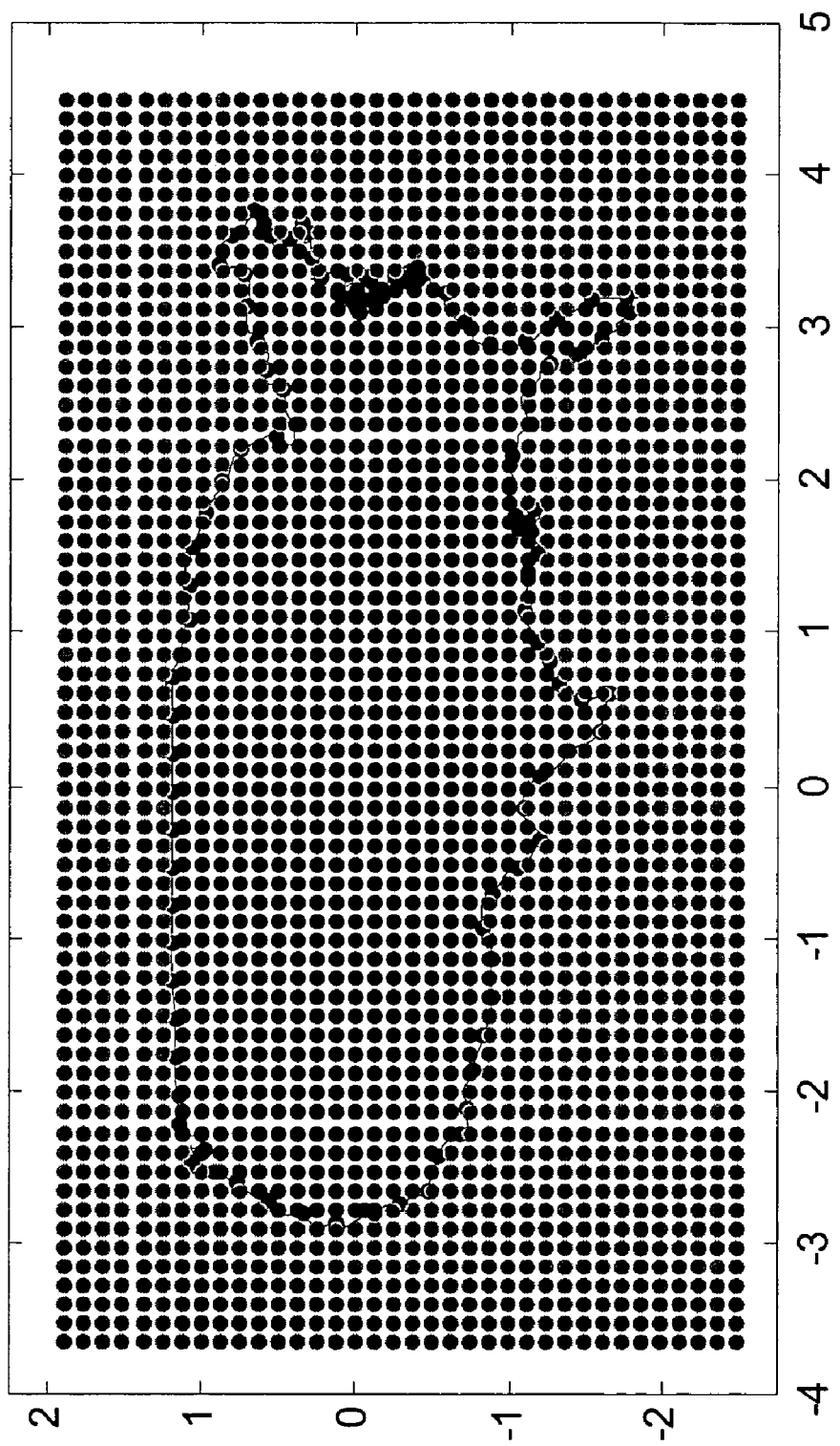
FIG. 9 is a graph illustrating PSA and extended points that include roll-off outside the continental U.S.
Figure 10:
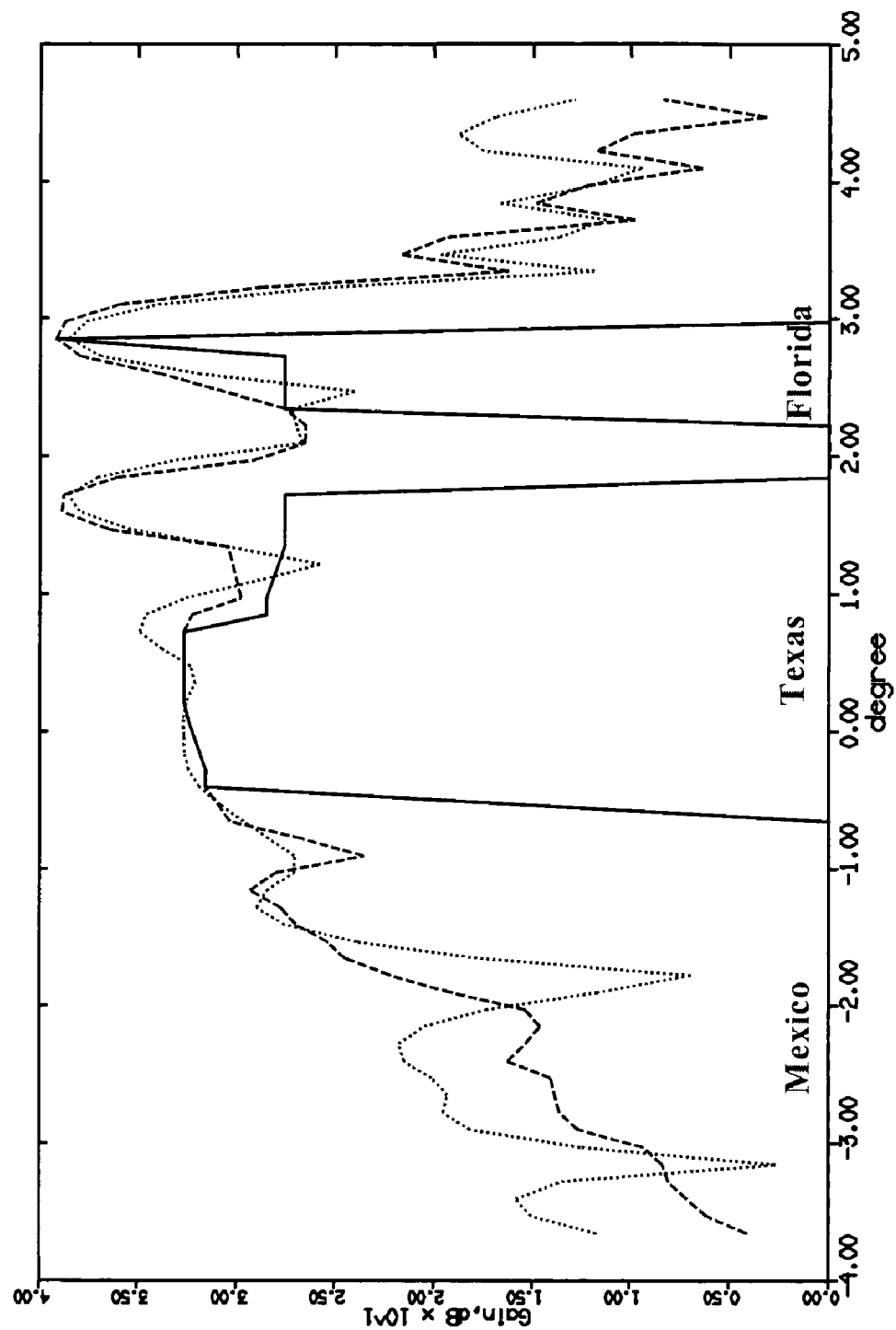
FIG. 10 is a graph illustrating a desired directivity and calculated directivity from the optimizer and antenna directivity estimator functions of the downlink power control function.

Extended points are added to the PSA points to extend coverage to include the roll-off outside the CONUS as shown in the graph of FIG. 9. The Antenna Directivity Estimator function 212 calculates new directivities for the extended points after the superposition process. The directivity curves from the Antenna Directivity Estimator function 212 and the Optimizer function 210 are shown in the graph of FIG. 10. The pattern is at elevation −1.112° (which cuts through Mexico, Texas and Florida). The desired directivity is indicated by the solid line, the directivity calculated from the Optimizer function 210 is the dotted line, and the ADE directivity is the dashed line. The pattern predicted by the Antenna Directivity Estimator function 212 is similar to the optimized antenna 112 pattern by the Optimizer function 210. They have similar power levels in the main lobe and side lobes; also, the nodes in the side lobes occur at roughly the same locations. This particular basis function, which is the antenna 112 pattern for all elements excited with uniform amplitude and phase, used in the Antenna Directivity Estimator function 212 has much better correlation with the Optimizer function 210 at the sidelobe power level and the node locations (roll-off outside CONUS) than other basis functions, such as Gaussian, cosine, sine, or an antenna 112 pattern with amplitude taper. The directivities of both the Antenna Directivity Estimator function 212 and the Optimizer function 210 have a peak 10 dB higher than the desired directivity at approximately 1.8° azimuth. This peak arises from the high desired directivity nearby at 1.8° azimuth but not at the elevation of −1.112°. Thus, the Antenna Directivity Estimator function 212 performs a superposition process in two-dimensions (both azimuth and elevation).

Calibration

Figure 11:
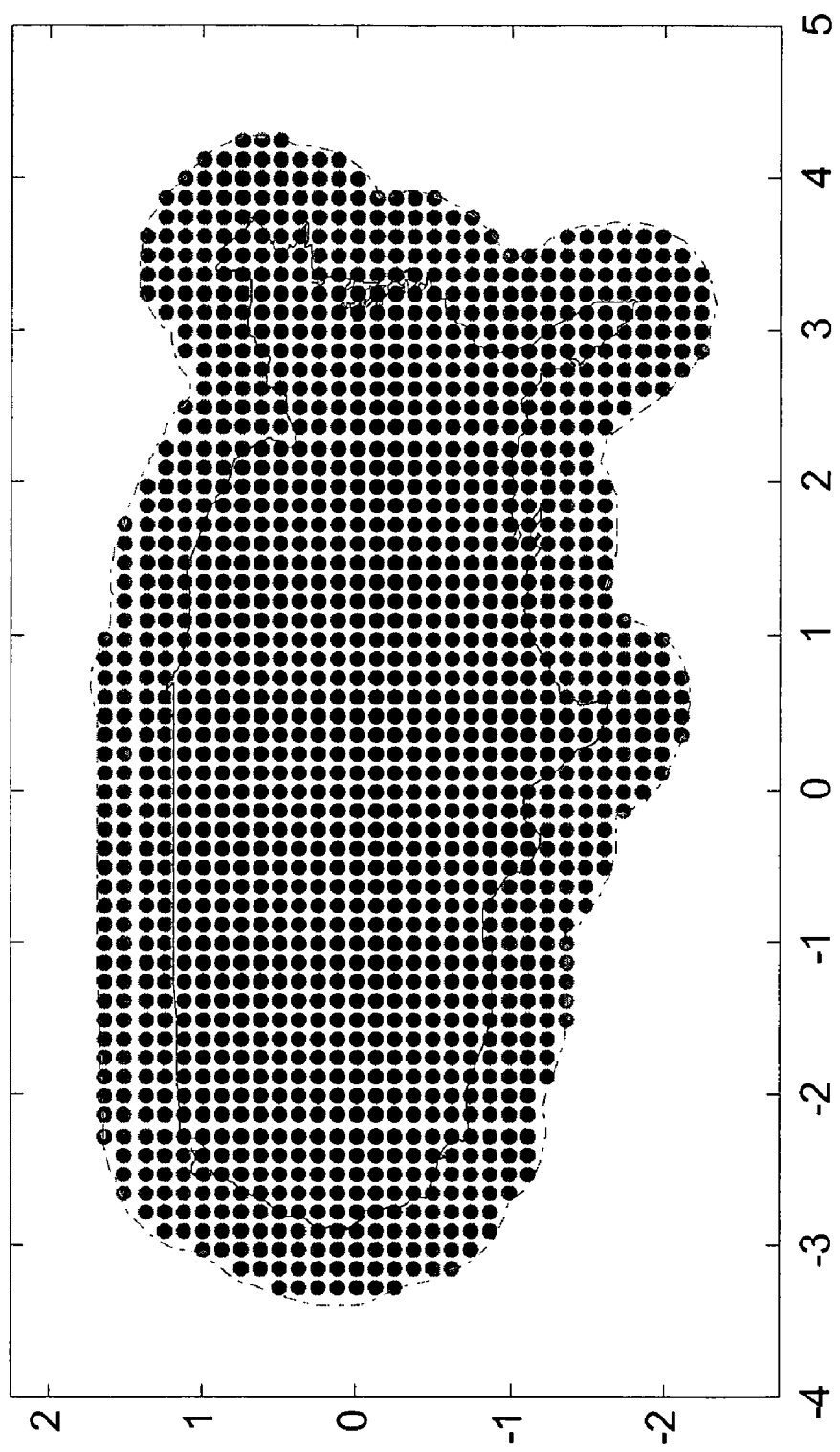
FIG. 11 is a graph illustrating a set of equal spaced points for evaluating a gain area product.

After the profile of the desired directivities has been smoothed by the superposition of the basis functions, the height of the profile needs to be calibrated to the right level to meet the rule of power conservation. The gain area product is calculated over the region shown in the graph of FIG. 11, which includes the CONUS (the black dots) and an extension of 0.5 degrees (the gray dots). It is assumed that the power over the region in FIG. 11 is a constant and is calculated based on the antenna 112 patterns from the Optimizer function 210.

Twenty-one analytical weather cases were used for the statistical study, as shown in Table 1 below. For example, cases 1-3 are the weather conditions with 2.0% of CONUS in rain, 8% in risk and the rest of the area in clear sky. The area in rain desires higher directivity than the area at risk. The 21 analytical weather cases were converted to 21 different desired directivity distributions based on 1/3 data rate mode at the highest availability.

TABLE 1

21 cases of weather conditions

| Case # | Rain | At risk |
|---|---|---|
| 1–3 | 2.0% | 8.0% |
| 4–6 | 3.0% | 12.0% |
| 7–9 | 5.0% | 10.0% |
| 10–12 | 7.5% | 12.5% |
| 13–15 | 10.0% | 15.0% |
| 16–18 | 12.5% | 17.5% |
| 19–21 | 15.0% | 20.0% |

The 21 cases of desired directivities were input to both the Antenna Directivity Estimator function 212 and Optimizer function 210 for analysis. The average gain area product, 29366.3, over the region is the average of the 21 cases calculated from the Optimizer function 210. The margin of the Antenna Directivity Estimator function 212 is given by:

$$ADE\ Margin = 10\ \log \frac{Average\ Regional\ Gain\ Area\ Product}{ADE\ Regional\ Gain\ Area\ Product}$$

The ADE margin is the height adjustment for the whole Antenna Directivity Estimator function 212 directivity pattern to meet the constant gain area product. The directivities difference between the Antenna Directivity Estimator function 212 and Optimizer function 210 are mostly less than ±1 dB within the CONUS.

Figure 12:
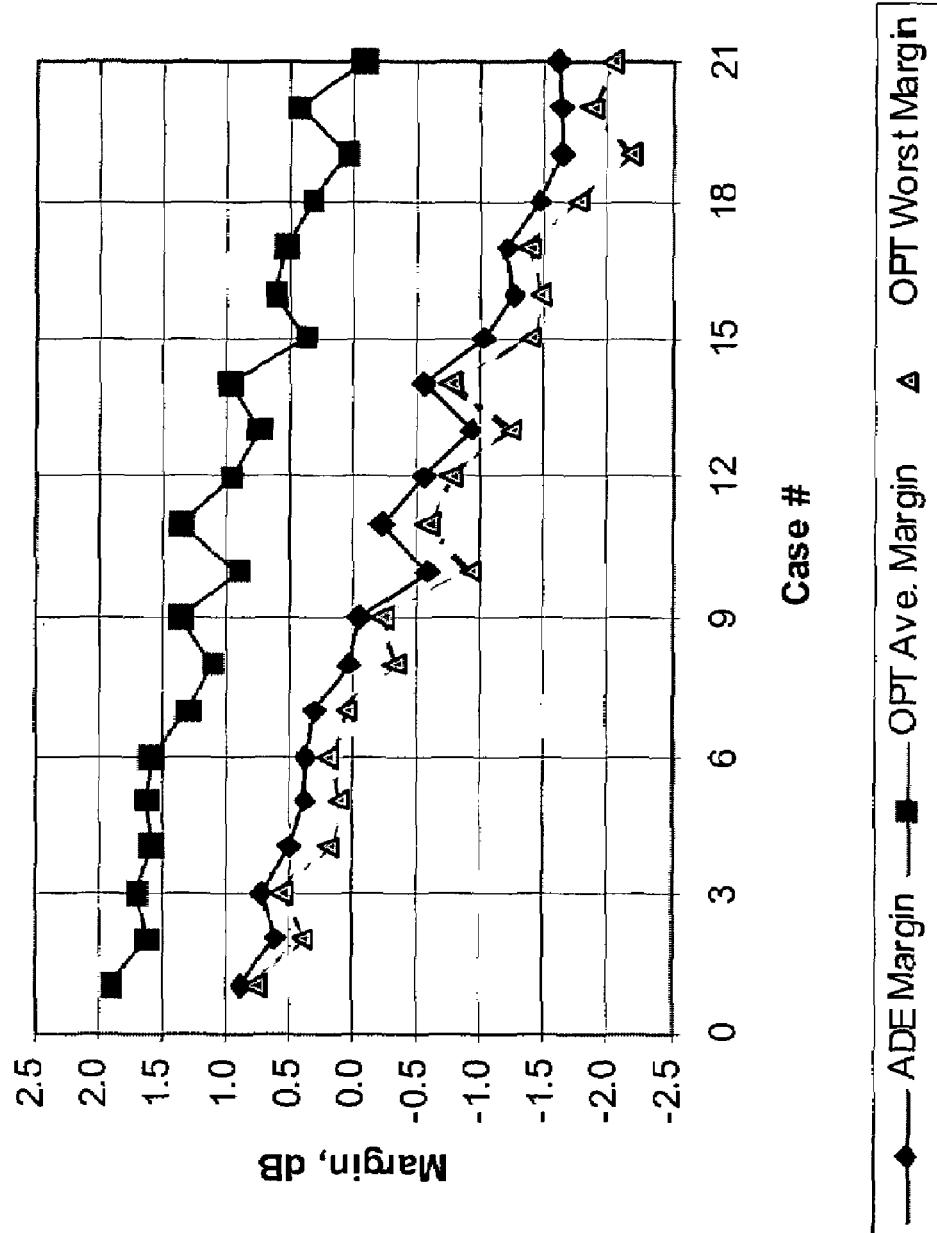
FIG. 12 is a graph illustrating a margin from the antenna directivity estimator function, and an average margin and worst margin from the optimizer function.

The worst case margin and the average margin of all the PSA points from the Optimizer function 210, along with the margin from the Antenna Directivity Estimator function 212, for the 21 weather cases are shown in the graph of FIG. 12.

Figure 13:
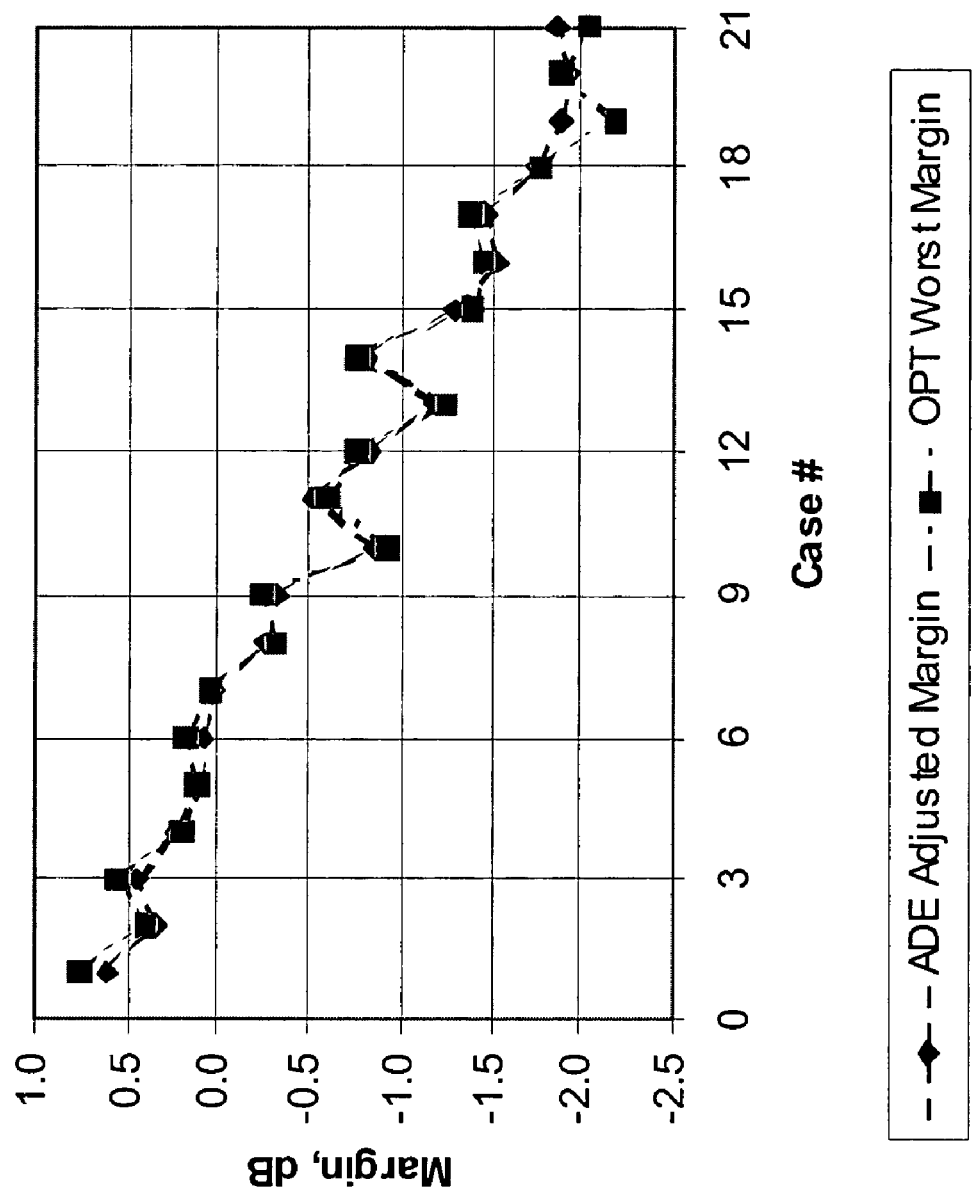
FIG. 13 is a graph illustrating a predicted worst case margin from the antenna directivity estimator function and a worst case margin from the optimizer function.

The three curves, ADE margin, Optimizer average margin and Optimizer worst case margin, follow each other well, as shown in FIG. 12. The ADE margin seems to correlate slightly better with the Optimizer worst case margin than the Optimizer average margin. The offset between the Optimizer worst case margin and the ADE margin is around 0.29 dB. Adjusting the ADE margin by −0.29 dB, a new curve is generated, as shown in the graph of FIG. 13.

The margin adjustment and the constant gain area product are calibrated using the 21 cases statistical study from the Optimizer function 210. They may change slightly based on the cases chosen for the study. Preliminary results in FIG. 13 show that CONUS antenna 112 in 1/3 data rate mode can support 3% of the microcells in rain and 12% of the microcells in at-risk at the highest availability. The system requirements allow tiered availability to meet more strenuous rain conditions. Approximately 1 dB of additional margin is provided to the system at the 1/4 data rate mode relative to the 1/3 data rate mode.

Conclusions

The Antenna Directivity Estimator function 212 correlates with the Optimizer function 210 quite well. Margins can be predicted in the Antenna Directivity Estimator function 212 with a simple and fairly accurate formula with the standard deviation of 0.105 and variance of 0.011 dB for the 21 cases statistical study.

1500 Elements

ADE Worst Case Margin=ADE Margin−0.29

ADE Margin=10 log (29366.3/ADE Gain Area Product)

The Antenna Directivity Estimator function 212 calculates the worst case margin of a directivity profile. If the margin is below the threshold (0 dB, TBD), the directivity profile is re-adjusted based on the population weighting. The Antenna Directivity Estimator function 212 re-calculates the margin of the new directivity profile. This loop continues until the margin is higher than a threshold. The achievable directivity profile is then passed to the Optimizer function 210 for the phase distribution of the elements of the antenna 112 as shown in FIG. 3.

The theory of the Antenna Directivity Estimator function 212 can be applied to other antennas as well. The Antenna Directivity Estimator function 212 acts as a filter to screen out the unachievable directivity profiles and is a good tool to speed up the Down Link Power Control 208.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of redistributing power radiated by an antenna comprised of a plurality of antenna elements, the method comprising:

(a) performing an antenna directivity estimator function to screen out inappropriate antenna directivity profiles from a plurality of antenna directivity profiles, thereby determining one or more remaining, appropriate antenna directivity profiles, wherein each of the antenna directivity profiles is represented as a set of Point Set Array (PSA) points over a coverage area, and each of the PSA points is assigned a desired directivity; and (b) performing an optimizer function on the remaining, appropriate antenna element directivities to determine a phase distribution for the antenna elements based on a desired power distribution for the antenna.

2. The method of claim 1, wherein the inappropriate antenna directivity profiles comprise impossible antenna directivity profiles.

3. The method of claim 2, wherein the antenna directivity estimator function is performed to screen out impossible antenna directivity profiles.

4. The method of claim 1, wherein the antenna directivity estimator function smoothes the antenna directivity profiles, while a total power for the antenna is conserved.

5. The method of claim 1, wherein the antenna directivity estimator function:
adds extended points to the PSA points;
performs a superposition process on the PSA points using a basis function;
generates an achieved directivity for the PSA points following the superposition process;
generates a regional gain area product and a margin adjustment using the achieved directivity for the PSA points;
generates a predicated worst case margin using the regional gain area product and margin adjustment.

6. The method of claim 5, wherein the extended points have a 0 db directivity.

7. The method of claim 5, wherein the basis function comprises a curve chosen for the superposition process to transform the desired directivities to smooth the antenna directivity profile.

8. The method of claim 5, wherein the basis function comprises a pattern with all antenna elements having equal amplitude and equal phase.

9. The method of claim 5, wherein the desired directivity at each PSA point is a delta function, and each delta function is replaced by the basis function with a same height for the antenna directivity.

10. The method of claim 5, wherein the desired directivity at each PSA point is increased by a maximum directivity increment due to the superposition of surrounding PSA points according to:

$$\Delta D_i = \max_{\substack{n=1,N \\ n \neq i}} [\Delta D_n]$$

wherein $\Delta D_i$ is a directivity increment of an ith PSA point due to superposition and $\Delta D_n$ is a directivity increment from an nth PSA point imposing on the ith PSA point.

11. The method of claim 5, wherein the antenna directivity estimator function calculates new directivities for the extended points after the superposition process.

12. The method of claim 1, further comprising readjusting the antenna directivities when the antenna directivity estimator function does not generate a positively adjusted margin.

13. The method of claim 1, wherein the optimizer function is performed within a specified time limit.

14. The method of claim 1, further comprising:
determining phases of the antenna elements based on the phase distribution; and
redistributing power to the antenna elements based on the determined phases.

15. An apparatus for redistributing power radiated by an antenna comprised of a plurality of antenna elements, comprising:
(a) means for performing an antenna directivity estimator function to screen out inappropriate antenna directivity profiles from a plurality of antenna directivity profiles, thereby determining one or more remaining, appropriate antenna directivity profiles, wherein each of the antenna directivity profiles is represented as a set of Point Set Array (PSA) points over a coverage area, and each of the PSA points is assigned a desired directivity; and
(b) means for performing an optimizer function on the remaining, appropriate antenna element directivities to determine a phase distribution for the antenna elements based on a desired power distribution for the antenna.

16. The apparatus of claim 15, wherein the inappropriate antenna directivity profiles comprise impossible antenna directivity profiles.

17. The apparatus of claim 16, wherein the antenna directivity estimator function is performed to screen out impossible antenna directivity profiles.

18. The apparatus of claim 15, wherein the antenna directivity estimator function smoothes the antenna directivity profiles, while a total power for the antenna is conserved.

19. The apparatus of claim 15, wherein the antenna directivity estimator function:
adds extended points to the PSA points;
performs a superposition process on the PSA points using a basis function;
generates an achieved directivity for the PSA points following the superposition process;
generates a regional gain area product and a margin adjustment using the achieved directivity for the PSA points;
generates a predicated worst case margin using the regional gain area product and margin adjustment.

20. The apparatus of claim 19, wherein the extended points have a 0 db directivity.

21. The apparatus of claim 19, wherein the basis function comprises a curve chosen for the superposition process to transform the desired directivities to smooth the antenna directivity profile.

22. The apparatus of claim 19, wherein the basis function comprises a pattern with all antenna elements having equal amplitude and equal phase.

23. The apparatus of claim 19, wherein the desired directivity at each PSA point is a delta function, and each delta function is replaced by the basis function with a same height for the antenna directivity.

24. The apparatus of claim 19, wherein the desired directivity at each PSA point is increased by a maximum directivity increment due to the superposition of surrounding PSA points according to:

$$\Delta D_i = \max_{\substack{n=1,N \\ n \neq i}} [\Delta D_n]$$

wherein $\Delta D_i$ is a directivity increment of an ith PSA point due to superposition and $\Delta D_n$ is a directivity increment from an nth PSA point imposing on the ith PSA point.

25. The apparatus of claim 19, wherein the antenna directivity estimator function calculates new directivities for the extended points after the superposition process.

26. The apparatus of claim 15, further comprising means for readjusting the antenna directivities when the antenna directivity estimator function does not generate a positively adjusted margin.

27. The apparatus of claim 15, wherein the optimizer function is performed within a specified time limit.

28. The apparatus of claim 15, further comprising:
means for determining phases of the antenna elements based on the phase distribution; and
means for redistributing power to the antenna elements based on the determined phases.

* * * * *